United States Patent [19]

Lama et al.

[11] 4,435,039

[45] Mar. 6, 1984

[54] METHOD AND APPARATUS FOR IMPROVING IMAGE QUALITY OF A REDUCTION/ENLARGEMENT GRADIENT INDEX LENS ARRAY

[75] Inventors: William L. Lama, Webster; James D. Rees, Pittsford, both of N.Y.

[73] Assignee: Xerox Corporation, Stamford, Conn.

[21] Appl. No.: 317,694

[22] Filed: Nov. 2, 1981

[51] Int. Cl.³ .................................................. G02B 5/16
[52] U.S. Cl. ............................... 350/96.25; 350/96.24; 350/96.31
[58] Field of Search ............... 350/96.24, 96.25, 96.31, 350/413; 355/1

[56] References Cited

U.S. PATENT DOCUMENTS

| 151,994 | 0/0000 | Rees . | |
|---|---|---|---|
| 3,658,407 | 4/1972 | Kitano et al. | 350/96 |
| 3,922,062 | 11/1975 | Uchida | 350/96 |
| 3,947,106 | 3/1976 | Hamaguchi et al. | 355/1 |
| 3,977,777 | 8/1976 | Tanaka et al. | 355/1 |
| 4,258,978 | 3/1981 | Cole | 350/96.25 |
| 4,331,380 | 5/1982 | Rees et al. | 350/96.25 |

OTHER PUBLICATIONS

"Gradient Index Optics: a review"; D. T. Moore; *Applied Optics;* Apr. 1, 1980; vol. 19, No. 7; pp. 1035-1038.

Primary Examiner—David K. Moore
Assistant Examiner—Robert E. Wise

[57] ABSTRACT

A reduction/enlargement gradient index lens array is modified to improve image quality and exposure at an imaging plane. In one embodiment, a masking element is placed in the optical path so as to permit minimum light transmitted through optical fibers located at the array ends and maximum light transmitted through the array center. In a second embodiment, a field stop is formed within the body of each fiber to accomplish the same end.

5 Claims, 6 Drawing Figures

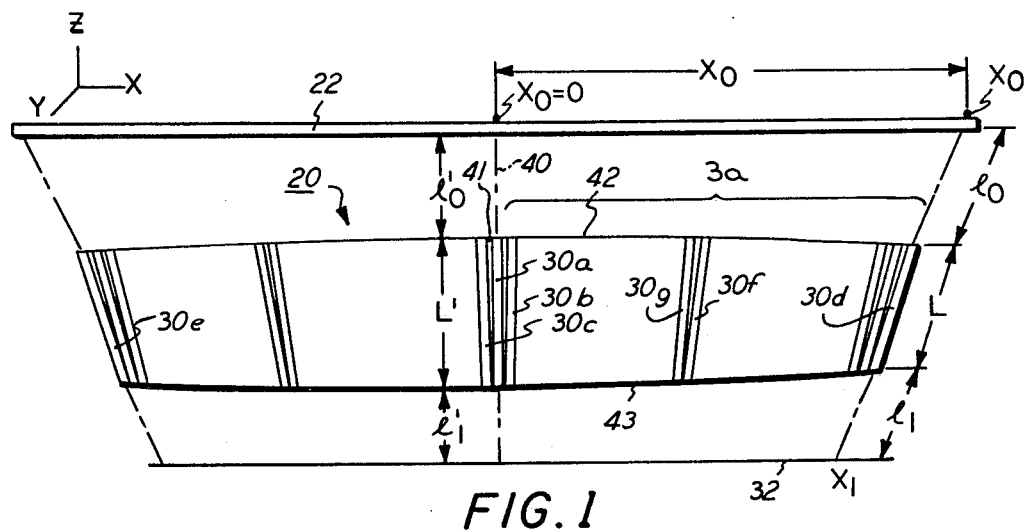
FIG. 1
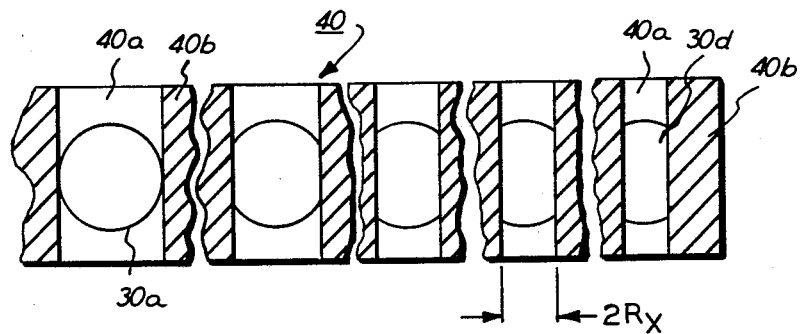
FIG. 2a       FIG. 2b
FIG. 3

METHOD AND APPARATUS FOR IMPROVING IMAGE QUALITY OF A REDUCTION/ENLARGEMENT GRADIENT INDEX LENS ARRAY

BACKGROUND AND PRIOR ART STATEMENT

The present invention relates to gradient index optical fibers and, more particularly to a bundled array of such fibers forming a lens array which transmits an image of an object at an object plane to an image plane at a magnification other than unity.

Image transmitters comprising bundled gradient index optical fibers are known in the art. U.S. Pat. No. 3,658,407 describes a light conducting fiber made of glass or synthetic resin which has a refractive index distribution in a cross section thereof that varies parabolically outward from a center portion thereof. Each fiber acts as a focusing lens to transmit part of an image of an object placed near one end. An assembly of fibers, in a staggered two-row array, transmit and focus an image of the object. The fiber lenses are produced under the trade name "SELFOC"; the mark is registered in Japan and owned by Nippon Sheet Glass Co., Ltd.

Numerous techniques are known in the art for manufacturing glass or plastic fibers with index-of-refraction variations. These are usefully summarized in an article entitled "Gradient Index Optics: A Review" by Duncan T. Moore, Applied Optics, Apr. 1, 1980, Volume 19, No. 7, pp. 1035–1038.

Gradient index lens arrays have found use in a number of technologies; e.g. in construction of printed type optical circuits as disclosed in U.S. Pat. No. 3,922,062 and as a replacement for conventional optical systems in copiers as disclosed in U.S. Pat. Nos. 3,947,106 and 3,977,777.

The lens arrays described above can be described as unity magnification lens arrays in that they transmit images from an object plane to an image plane at a magnification ratio of 1:1. In a copending U.S. application Ser. No. 151,994 filed on May 21, 1980, now U.S. Pat. No. 4,331,380, there is described a gradient index lens array which transmits reduced or enlarged images, the specific magnification depending upon the geometry and orientation of the fibers comprising the array. Unlike the unity magnification lens arrays of the prior art, which produce a uniform exposure level at an imaging plane, the reduction array creates an exposure level which is minimum in the array center and increases outward towards the ends of the array. Since image exposure is desired to be uniform at all points, some compensation must be included in the system geometry. A further characteristic of the reduction array is the deterioration of image quality towards the ends of the array. It would be most desirable to simultaneously compensate for both exposure and the image quality. This has been accomplished, according to the present invention, by analyzing the system geometry and, particularly, the effects of selectively altering the fiber aperture in the array direction and then introducing appropriate modifications into the lens array.

SUMMARY

The present invention is therefore directed to an optical system for transmitting an image of an object lying in an object plane onto an image plane at a magnification other than unity, further including a lens array comprising a plurality of gradient index optical fibers bound together in side by side relationship, the fibers arranged so that those in the center of the array have their axes substantially perpendicular to the object and image plane while adjoining fibers are progressively tilted in fan-like fashion towards the ends of the array so that their axes increasingly depart from said substantially perpendicular orientation, the array further including masking means adapted to permit maximum light transmitted through central areas of said array but to transmit increasingly less light through fibers extending in the array direction.

DRAWINGS

FIG. 1 is a frontal view of a reduction gradient index lens array in an imaging system.

FIG. 2 is a two-dimensional image irradiance profile of a luminous object point located near the end of the array of FIG. 1.

FIG. 3 shows a number of array fibers selectively masked so as to reduce fiber radius at the fiber face.

DESCRIPTION

Figure 4:
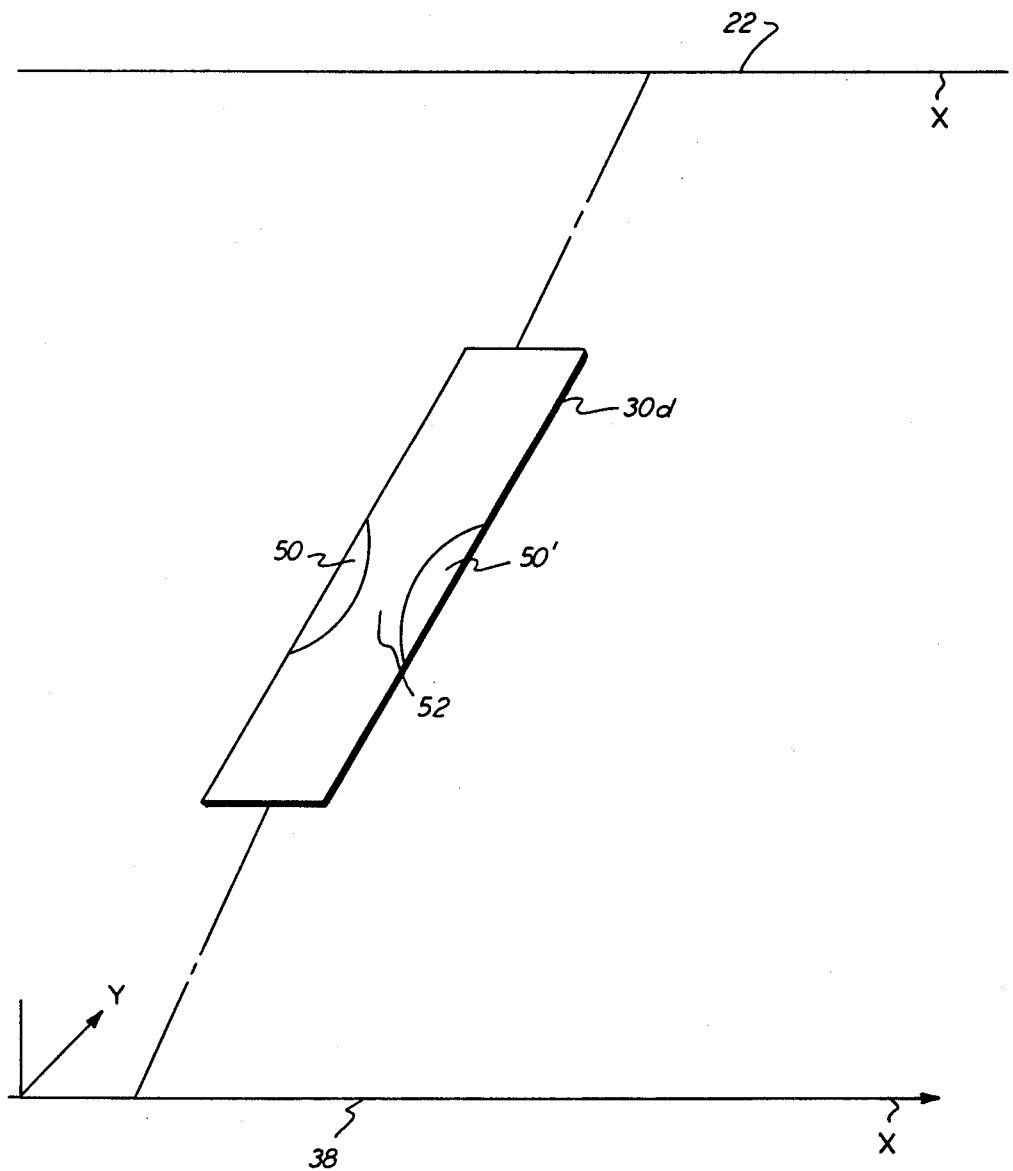
FIG. 4 shows a single optical fiber having a reduced light transmitting cross-section.

Referring now to FIG. 1, there is shown a front view of a reduction gradient index lens array constructed according to the principles set forth in copending U.S. application Ser. No. 151,994, now U.S. Pat. No. 4,331,380, whose contents are hereby incorporated by reference.

An object 22, which can be a document located in an object plane, is moved past lens array 20 in a direction extending into the page. An illumination means (not shown) provides intense illumination onto successive narrow strips of the document running parallel to the lens array (X-direction). Lens array 20 comprises a single row 30 of optical fibers arranged in a manner to be more fully described below. In operation, document 22 is moved past the illuminated area at a speed appropriate to the particular magnification and to the speed of image plane 32 which can be a photosensitive sheet, moving in the same direction as the document. Light reflected from the document is transmitted by lens array 20 as a reduced image onto sheet 32. The reduced image is formed as a contiguous and overlapping plurality of reduced images from each individual fiber, as described more fully in said copending application.

For illustrative purposes, assume that document 22 is an A3 original (width=297 mm) which is to be reduced to A4 size (210 mm), i.e. lens 20 is a 0.707X lens. Lens array 20 comprises a plurality of individual gradient index fibers 30a, 30b, 30c, 30d, 30e, ... which have the same radius, (e.g. 0.5 mm); the same axial index of refraction and the same index gradient but which differ, each from the other, in length and in orientation of the fiber axis and in the orientation of their end faces with respect to the object and image planes and in the orientation of their end faces with respect to their axes. As shown, fiber 30a at the center of the array ($X_o=0$) is in vertical orientation, i.e. its axis 40 is perpendicular to the object and image planes. The axes of adjoining fibers, i.e. 30b, 30c are slightly displaced from the perpendicularity condition, the displacement continuing out to the fibers at the ends of the array. The interfiber displacement value may be a constant value but other values are possible. The spaces 41 between fibers can be filled with a black silicon resin for light absorbing purposes, as is known in the art.

The light ray from the document that passes down the geometrical axis of an endmost fiber 30d (i.e. the central axial light ray for fiber 30d) images document point $X_o=148.5$ mm at the reduced photoreceptor point $X_1=m_oX_o=105.0$ mm, where $m_o$ is the desired magnification (0.707). The relationship $X_1=m_oX_o$ is maintained for the central axial ray passing through each fiber of the array, and the object and image vertex distances ($l_o,l_1$) are chosen to provide the correct magnification near the central axial ray of each fiber.

The lens assembly, as a whole, lies in a vertical plane which is perpendicular to the object plane but the lens is comprised of a plurality of fibers with a plurality of axes, each axis forming a different angle with respect to a line normal to the object plane.

This orientation results in the total conjugate of the light path through each fiber changing from a first value at the center fiber to progressively higher values at the endmost fibers. To accommodate this conjugate change, the lengths of the fibers are progressively decreased from the center outward. A grinding and polishing operation results in the formation of the two smooth convex faces 42, 43.

A radiometric analysis of lens array 20 indicates that image exposure increases from the center of the array out to the array ends. The following table summarizes the relevant lens and radiometric parameters at the center (fibers 30a) and at the ends (fibers 30d or 30e).

|  | h/N | $k_x$ (mm) | $k_y$ (mm) | b | $E/\frac{N}{(V)}$ |
|---|---|---|---|---|---|
| CENTER (fiber 30a) | $11 \times 10^{-4}$ | 1.73 | 1.73 | .997 | $6.9 \times 10^{-3}$ |
| END (fiber 30d) | $7 \times 10^{-4}$ | 2.70 | 2.10 | 1.04 | $8.0 \times 10^{-3}$ |
| END/CENTER | .64 | 1.6 | 1.2 | 1.04 | 1.16 |

The first column lists the peak radiance h/$_N$ obtained for the individual fibers, normalized by the document radiance N. It is seen that the peak irradiance for the tilted end fiber is 64% of the value for the center fiber. This factor alone would reduce the image exposure at the ends of the array when compared to the exposure at the center of the array. However, the irradiance profile produced by the central fiber 30a is circular, with radius 1.73 mm, while the profile produced by the end fiber is elliptical, with semi-major axis $k_x=2.7$ mm (in the array direction) and semi-minor axis $k_y=2.1$ mm. Thus, the size of the irradiance profile produced by the end fiber is much larger than the size of the central irradiance profile. This factor leads to a larger exposure at the ends of the array relative to the center. The second last column (b=profile spacing fiber diameter) shows that the irradiance profiles of the individual fibers are closer together in the center (b=0.997) than at the ends of the array (b=1.04). The last column lists the image exposure E normalized by document radiance N, and process speed V. When all the factors are combined, the exposure at the ends of the array exceeds the value at the center by 16%.

In addition to the increase in exposure towards the ends of the array, the image quality is also lessened at the ends of the array. This is shown by a two dimensional image irradiance profile (point spread function) of object point $X_o$, as shown in FIG. 2. The profile is plotted in the X direction (along the array) and in the Y direction (perpendicular to the array). Each profile is a composite of point spreads produced by five contributing fibers. The composite profile is nearly elliptical with its long dimension parallel to the array. The fourier transform of the point spread function yields an image plane MTF (modulation transfer function) equal to 40% at ~2.5 cycles/mm for object lines running perpendicular to the array, while 40% modulation is obtained at ~5 cycles/mm for lines parallel to the array. For comparison, the central fibers (e.g. 30–30c) resolve ~10 cycles/mm at 40% modulation.

According to one aspect of the present invention, it was determined that the dimensions of the point spread vary approximately with the radius of the array fibers. It was further known that the image exposure is proportional to the cube of the fiber radius. It was therefore perceived that techniques which progressively reduce the actual or effective fiber radius from array center outward to the array ends will lead to simultaneous improvement of image quality and exposure uniformity.

FIG. 3 shows a first modification to lens array 20 which results in the desired reduction of effective fiber radius in the array direction. Referring to FIG. 3, there is shown a top view of the right half of lens array 20. A mask 40 has been placed over array face 42, the mask consisting of clear and opaque slits 40a, 40b respectively. The width of the clear slit is at a minimum at the array end (fiber 30d) and is gradually increased until centermost fiber 30a is completely unobstructed. This mask reduces the fiber aperture at the face of each fiber and may be referred to as an "aperture stop". Mask 40 can thus be understood as reducing the fiber face radius in the array direction to $R_x=fR$ where $f \leq 1$. As the array center is approached, the clear slit widths 40a (2fR) are successively increased so that $f=1$ at fiber 30a. The point spread in the array direction ($W_x$) is proportional to $R_x$, while the exposure depends on ($R_x^2R$). To equalize the exposure requires $1.16f^2=1.00$, or $f=0.93$ at the ends of the aray. This mask will also reduce the point spread in the array direction to $W_x'=fW_x=(0.93)(0.4)=0.37$ mm, which improves the resolution in the array direction to 2.7 cycles/mm at 40% modulation. Thus, an improvement over the original 2.5 cycles/mm is obtained while the desired exposure uniformity is simultaneously achieved through the use of the mask. If a further improvement in resolution is desired, the clear widths 40a of the mask near the array ends, may be reduced further, yielding reduced point spreads $W_x'$ and increased MTF. For example, if $W_x'$ is reduced to 0.30 mm, then 40% MTF is obtained at 3.4 cycles/mm, a significant improvement. In this case, the exposure at the ends of the array is reduced to ~65% of the value at the center. While the mask is shown applied to top surface 42 of array 20, it can also be affixed to bottom surface 43 with the same results.

Referring now to FIG. 4, there is shown a masking technique which reduces the effective fiber radius at some point along the length of the fiber. The figure shows a single fiber 30d with opaque areas 50, 50' formed at the surface of the fiber and extending some distance towards the center. Areas 50, 50' can either be formed by an etching process, or by an ion diffusion process prior to assembly. The etching or diffusion is controlled so that the opaque areas and permit a precisely defined amount of light to be transmitted through the constricted passage 52 defined between the two areas. This type of mask will reduce the field of view of the individual fiber and may thus be referred to as a "field stop". Field stops also increase the MTF by reducing the point spread.

Figure 5:
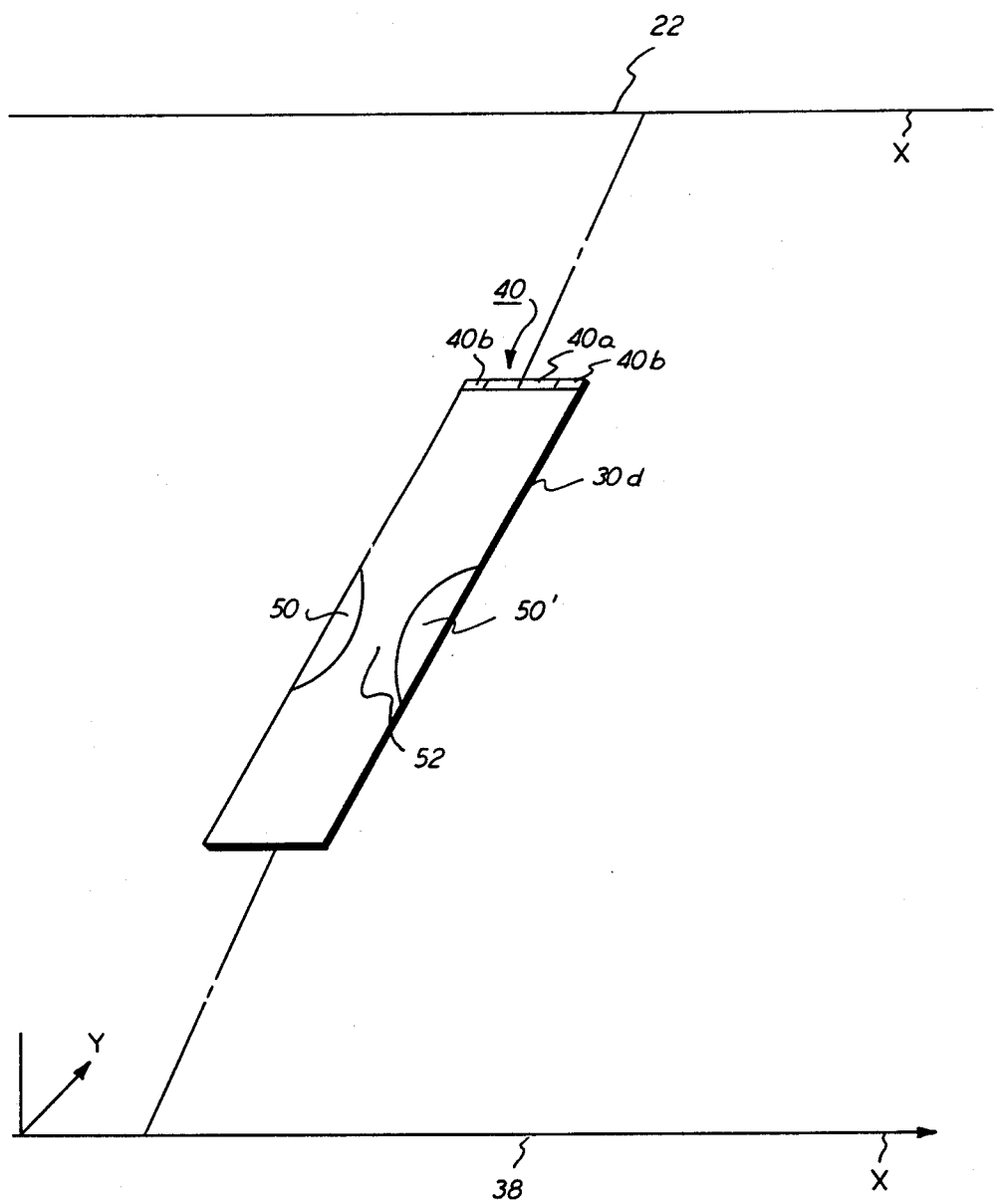
FIG. 5 shows a single optical fiber having a reduced light transmitting cross-section in combination with a fiber face mask.

The two masking techniques may also be combined to further improve the image by reducing image defects (aberrations). The aperture stop would be most effective in reducing aberrations which are functions of aperture radius; e.g. spherical aberration, and coma. The field stop reduces those aberrations which are a function of field height; e.g. astigmatism, field curvature, distortion and lateral color. Accordingly, and as shown in FIG. 5, an optimum system would include both the field stop formed by opaque area 50, 50' as well as the aperture stop formed by mask 40. In this instance, the combined stops reduce the effective radius of the fiber.

Further techniques consistent with the principles of the invention may also be used to obtain the desired reduction of point spread and increased MTF. For example, spectral filters may be constructed with appropriate band width and transmission characteristics to filter the light transmitted through the fibers near the ends of the array to cause selective exposure reduction and image quality improvement. The following claims are intended to cover all variations and modifications as fall within the spirit and scope of the invention.

We claim:

1. An optical system for transmitting an image of an object lying in an object plane onto an image plane at magnification other than unity, said system including a lens array comprising a plurality of gradient index optical fibers bound together in side by side relationship, the fibers arranged so that those in the center of the array have their axes substantially perpendicular to the object and image plane while adjoining fibers are progressively tilted in fan-like fashion towards the ends of the array so that their axes increasingly depart from said substantially perpendicular orientation, the array further including masking means adapted to permit maximum light transmittal through central areas of said array but to transmit increasingly less light through fibers extending in the array direction.

2. The optical system of claim 1 wherein said masking means is a strip of alternating light transmissive and light blocking segments, said strip affixed to an end surface of the array.

3. The optical system of claim 1 wherein said masking means comprises a plurality of matching opaque areas formed within the individual fibers, each opaque pair defining a radiant light transmission path between said areas.

4. The optical system of claim 1 wherein said masking means comprises, in combination, a strip of alternating light transmissive and light blocking segments, said strip affixed to an end surface of the array, and a plurality of matching opaque areas formed within the individual fibers, each opaque pair defining a radiant light transmission path between said areas.

5. A method for forming a gradient index lens array capable of transmitting an image of an object at an object plane onto an image plane at a magnification other than unity and at uniform exposure levels comprising the steps of:

selecting the desired magnification ratio;

joining together a plurality of gradient index fibers of first length into at least one row, the fibers adjoining a centrally located fiber oriented so that their axes are progressively displaced outward towards the end of the row in relation to the axis of the center fiber which has an axis perpendicular to said object and image planes;

determining the proper lens to object vertex distance ($l_o$) and lens to image vertex distance ($l_1$) for each fiber;

reducing the length of each individual fiber to obtain the $l_o$, $l_1$ required distances; and introducing masking means along the width of the array, said masking means adapted to permit maximum light transmittal through central areas of said array but to transmit increasingly less light through fibers extending in the array direction by progressively decreasing effective aperture of said fibers in said array direction.

* * * * *